INVENTOR
WILLIAM MARGOLIN

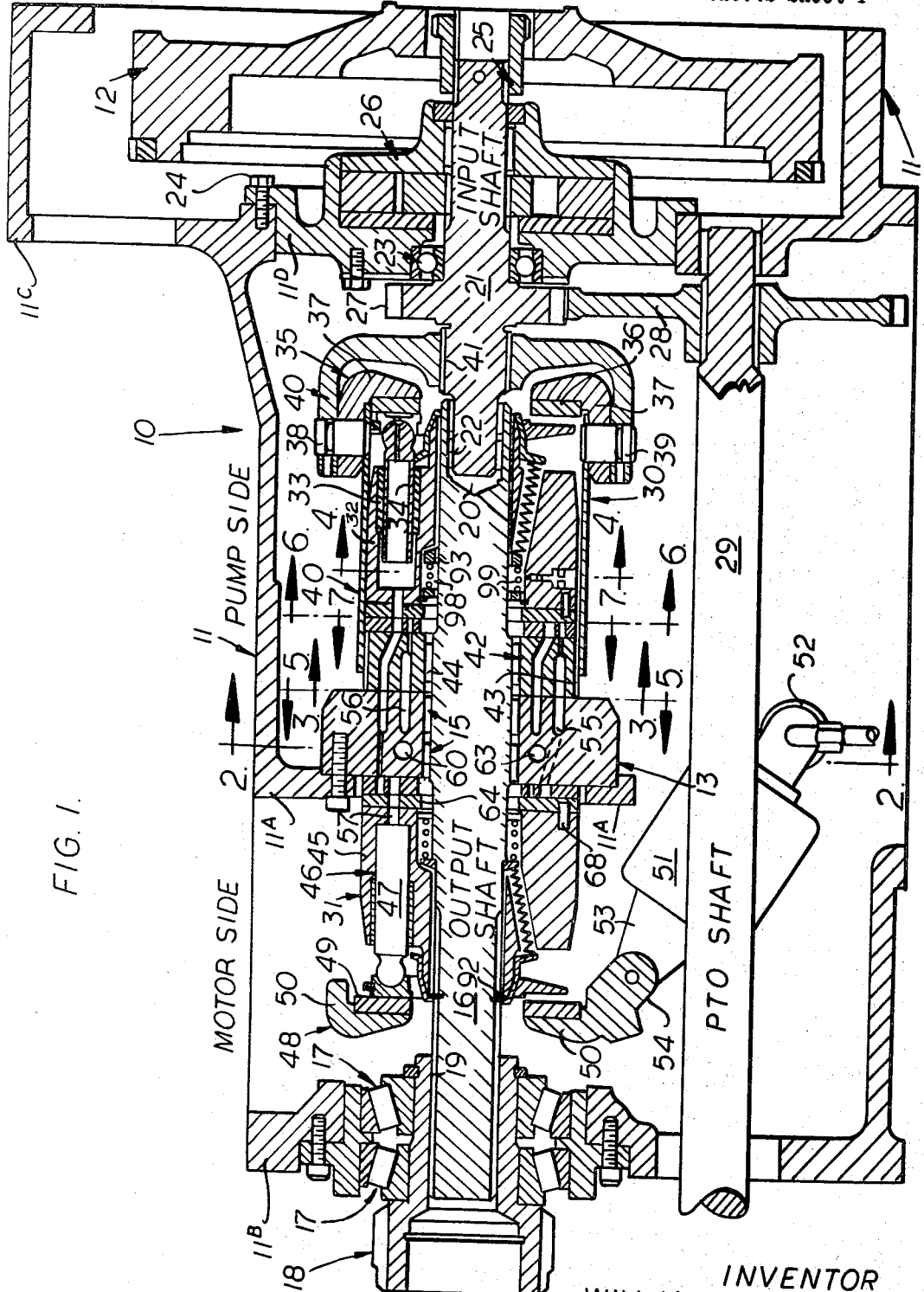

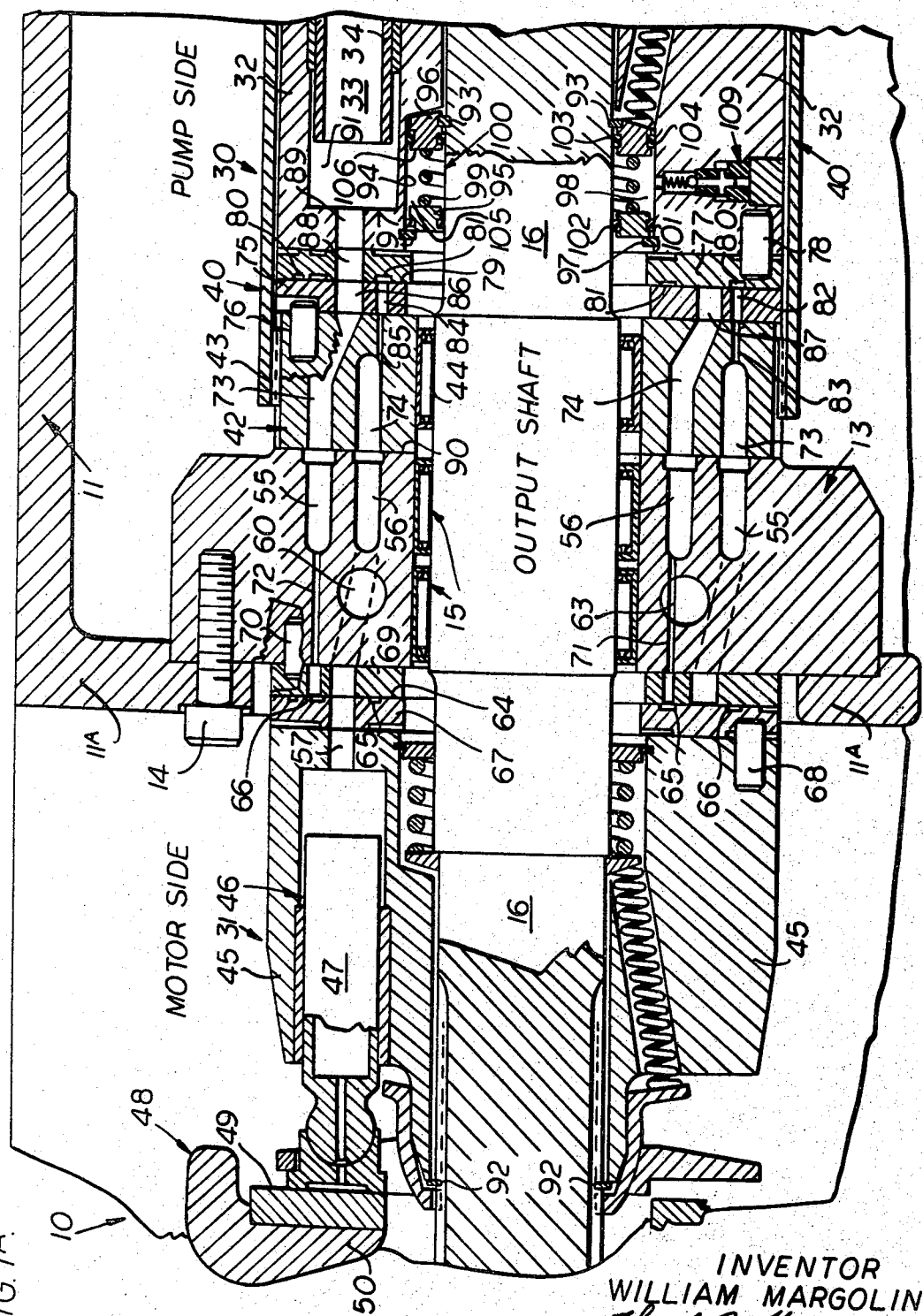
FIG. IA.
INVENTOR
WILLIAM MARGOLIN
Floyd B. Harman
ATTY

ATTY

United States Patent Office 3,416,312
Patented Dec. 17, 1968

3,416,312
FORCE COMPENSATING MEANS FOR AXIAL PISTON MACHINES
William Margolin, Chicago, Ill., assignor to International Harvester Company, Chicago, Ill., a corporation of Delaware
Filed Dec. 27, 1966, Ser. No. 604,873
12 Claims. (Cl. 60—53)

ABSTRACT OF THE DISCLOSURE

For an axial piston type hydraulic energy translating machine auxiliary hydraulic piston means are provided for urging the cylinder block members into fluid sealing engagement with associated valve plates at the abutting interfaces; the piston means being disposed in a cylinder block in continuous fluid communication with the high pressure side of the fluid working circuit whereby the magnitude of force urging engagement of the cylinder block members with associated valve plates is proportional to the load applied to the machine.

---

This invention relates to fluid pressure sealing means for preventing or minimizing fluid leakage at valve plate-cylinder block interfaces of hydraulic axial piston machines. More in particular this invention relates to means for reducing or substantially eliminating fluid leakage losses at valve plate faces of hydraulic pumps and motors of the axial piston type. Still more in particular this invention relates to a hydraulic force compensating means for reducing or substantially eliminating fluid leakage losses at valve plate faces of infinitely variable speed ratio hydraulic power transmissions of the axial piston type.

In general there are two basic forms of infinitely variable speed ratio power transmissions of the axial piston type. One is generally referred to as a hydrostatic power transmission and the other referred to as a hydromechanical power transmission.

Hydrostatic power transmission means of the axial piston type differs from hydromechanical power transmission means in one major respect. The former means is entirely dependent upon the movement of fluid under pressure to transmit power and thus the power train from the input shaft to the output shaft is singular in nature. The latter means divides the power train into two paths, one being mechanical and the balance being hydrostatic. From this it will be apparent that, structurally, a mechanical force reaction means is required which mechanically transmits reactive forces from the hydraulic pump input shaft to the transmission's output shaft. Thus generally speaking in a hydromechanical power transmission the power train is entirely mechanical when the input shaft drives the output shaft in the same direction at the same speed (direct drive) for in such instance the fluid pump is under hydraulic lock and there is no fluid flow.

In hydraulic energy translating mechanisms such as hydraulic pumps and motors of the axial piston type there is at least one cylinder block positioned in abutting relation with a valve plate. These rotate relative to each other for valving high pressure and low pressure hydraulic fluid to and from the cylinders within the cylinder block in operative relation. It can be readily appreciated if the summation of forces urging together the valve plate and cylinder block are too great then the efficiency of the device is reduced because of excessive friction. Furthermore, if the summation of such forces is too great the valve interfaces may become damaged by scoring. On the other hand if the summation of forces urging together the valve plate and cylinder block are too small then the valve plate and the cylinder block will separate due to the hydraulic working pressure thus causing high leakage losses which also results in lowering the efficiency of the device.

From the above it will be apparent that the forces tending to separate the cylinder block from its associated valve plate are related to the load imposed on the hydraulic device for the working hydraulic pressure differential is proportional to the load. Therefore variations in the load applied to or by the hydraulic device correspondingly varies the force tending to separate the cylinder block from its associated valve plate at the interface therebetween. It will therefore be readily apparent that if the summation of forces urging the cylinder block against its associated valve plate was automatically adjusted such that it would be just slightly greater than the opposite forces tending to separate the cylinder block from its associated valve plate then both the fluid leakage losses and friction losses would be reduced to a minimum thus improving the overall efficiency of the energy translating device. It is therefore a principal object of the present invention to provide, in a hydraulic energy translating device, an auxiliary balancing force means for producing a substantially balancing force urging the cylinder block of said device and its associated valve plate toward each other which force is proportional to the load imposed upon the device.

A further important object of the present invention is to provide, in a hydraulic energy translating device, an auxiliary balancing force means according to the preceding object wherein said means includes an annular shaped hydraulic cylinder concentrically positioned to urge the cylinder block and its associated valve plate toward each other.

A still further object of the present invention is to provide the auxiliary balancing force means according to the preceding object wherein the annular shaped hydraulic cylinder or concentric ram is always energized from the high pressure side of the hydraulic working circuit thereby exerting a mechanical force proportional to the load applied to the energy translating device.

These and other important and desirable objects inherent in and encompassed by the invention will be more readily understood from the ensuing description, the appended claims and the annexed drawings of a preferred embodiment of the invention wherein:

FIGURE 1 is a vertical section of a hydromechanical power transmission including the auxiliary balancing force means according to the present invention;

FIGURE 1A is an enlarged portion of the transmission of FIGURE 1, partly broken away, illustrating the balancing force means or mechanism of the present invention more in detail;

Figure 6:
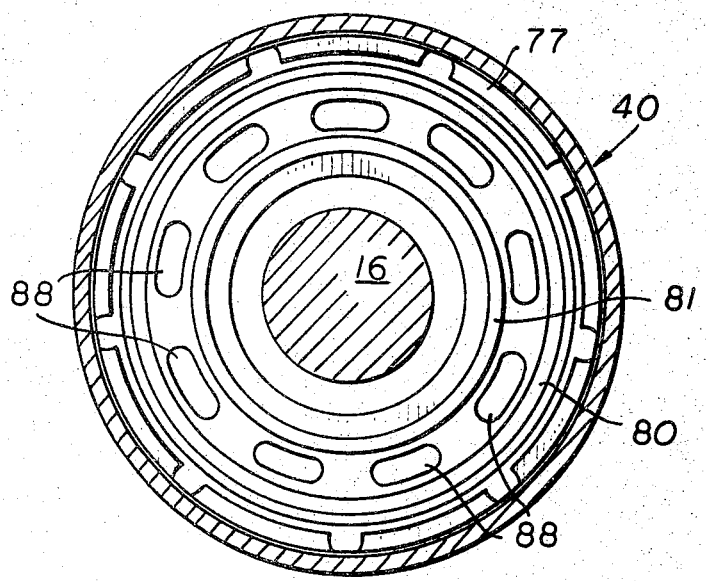
Figure 7:
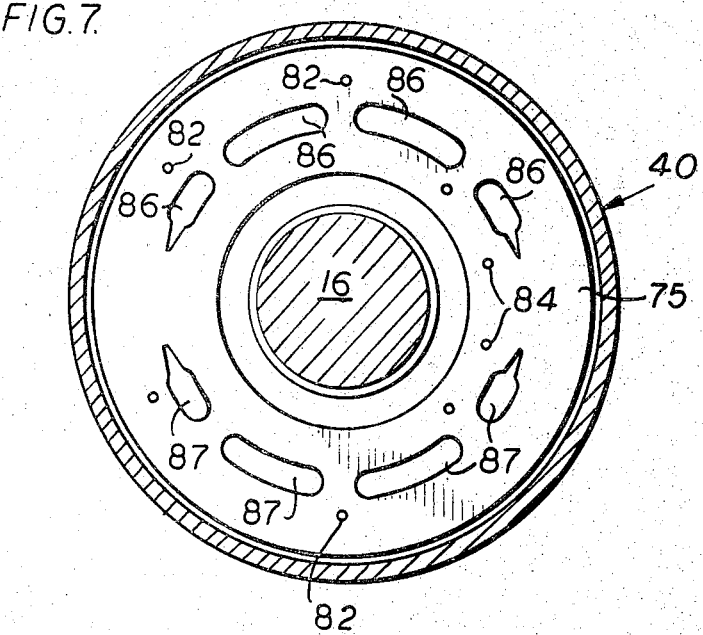

FIGURE 6 is a view, partly in section, taken along the line 6—6 of FIGURE 1 showing the inner end face or surface of the transmission's pump cylinder block; and FIGURE 7 is a view, partly in section, taken along the line 7—7 of FIGURE 1 showing the outer end face or mild mechanical treatment may, for instance, consist of striking, rubbing, brushing, or vibrating. Such treatment during the electrical treatment will not only fold out but also spread the material out.

At this point in the flow sheet of FIGURE 1 the sheet material is in a spread-out condition wherein the individual fibrils, making up the material, are parallel to the longitudinally axis of the sheet material. In many cases, and for many applications, this is a desirable configuration. However, for certain textile products the yarn used in the manufacture therein should not be lean and smooth but rather should have a high percentage of loose fibrils along the surface of the web or sheet as the case may be. For instance, in the case of blankets, carpets, and fabrics made from woolen yarns, it is essential to use a bulky yarn which is not produced under the process described in the above-identified patent.

My invention resides in forming a pile fabric from this polymeric sheet material as it emerges from the folding-out step.

Figure 2:
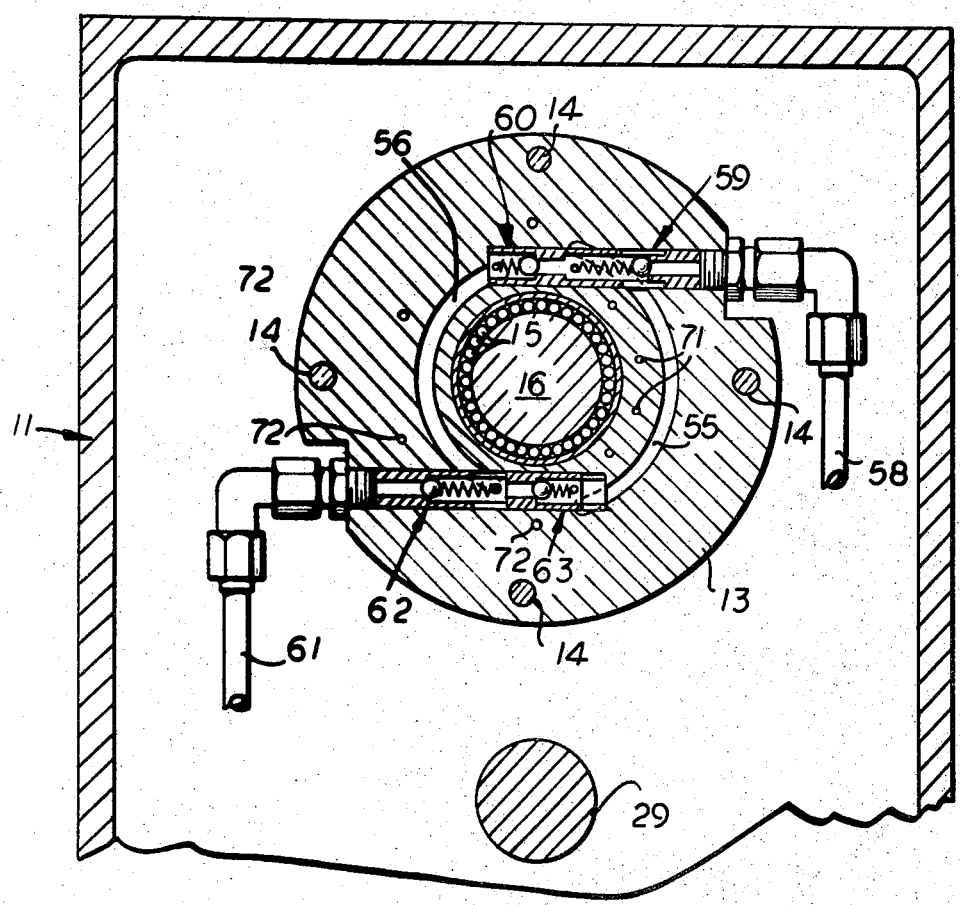
FIGURE 2 is a sectional view, taken on line 2—2 of FIGURE 1, showing details of construction of the stationary valve plate.
Figure 3:
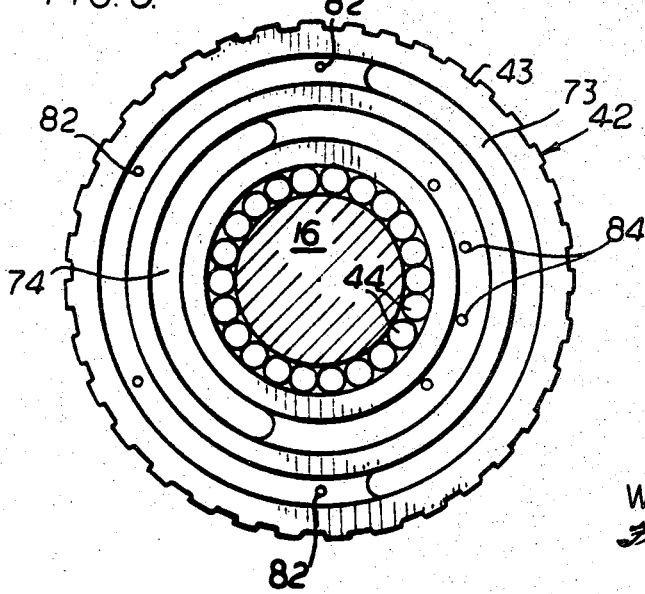
FIGURE 3 is a view taken along the line 3—3 of FIGURE 1 showing one end view of the rotating valve plate.

With reference to FIGURES 2 and 3, after the sheet material 10 has been folded out as described hereinabove, it passes between a pair of generally cylindrical rollers 12 and 13, which are rotatably mounted in frame plates 14 and 16 respectively. These frame plates 14 and 16 extend vertically from a base plate 18 which is mounted on wheels 20. This unit is able to be wheeled into a position to receive the film 10 directly from the folding-out step described in FIGURE 1 in the event that it is desirable to make the whole process continuous. The sheet or web 10 passes from the rollers 12 and 13 to a roller 54 (see FIGURE 6) which is also rotatably mounted in plates 14 and 16.

With reference to FIGURE 6, a plurality of rollers 54 are shaped to form a crown 56 at their centers. As a result, the fibrils in the central portion of film 10 passing over the crown 56 will break while those in the edge portion of the film passing over the edge of the roller will not. This action of crowned rollers 54 (FIGURE 2) causes the fibrils in the center portion of sheet 10 to break. This web is particularly useful in making yarn and as such it is twisted by conventional yarn twisting means as it is wound onto a spool 58.

As shown in FIGURES 2 and 3, rollers 13, 54 (only one roller is shown; however, it would be within the skill of the art to connect a plurality of crowned rollers into the mechanism) and 29 are connected to a suitable driving mechanism 30. This mechanism comprises an endless belt or chain 32 which passes over a pulley or sprocket 34 which is fixed to roller 54, then over a sprocket 36 which is fixed to roller 13, then over a sprocket 38 which is fixed to roller 29, then over an idler sprocket 40, then over a drive sprocket 42, which is driven by any suitable power source such as electric motor 44, and finally back over sprocket 34. The rollers 12, 13, 54, 28, and 29 are rotated in the directions shown by the arrows.

Figure 4:
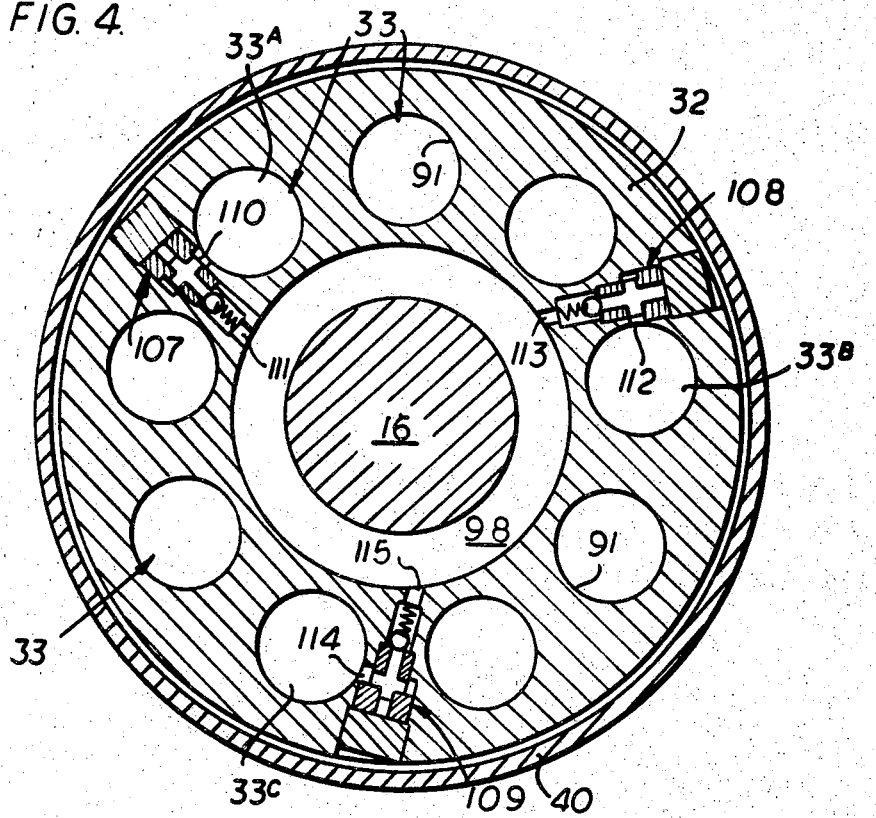
FIGURE 4 is a sectional view taken along the line 4—4 of FIGURE 1 illustrating the position of the annular shaped auxiliary force balancing cylinder and its associated check valve means for energizing it from the high pressure side of the transmission's working circuit.

With reference to FIGURE 4, roller 22 is provided with a plurality of grooves 24 and a plurality of needles 26 or other similar sharp, pointed implements, which project radially from the center of the grooves 24. These needles may be secured in the grooves 24 in any suitable manner. As the sheet 10 passes over the roller 22, portions of it are channelled into the grooves 24 and become impaled upon the needles which penetrate through the sheet material and cause a portion of the individual fibrils to be severed. The degree of breakage would be determined by the number of grooves in the roller and the number of pins in the grooves; however, no more than one-half of the fibers passing over the roller should be broken in order to retain sufficient web strength. In the preferred embodiment we show only one roller but it would be within the skill of the art to adapt a plurality of rollers over which the film could be passed. The film after passing over the pin-studded roller 22 is received by a pair of pick-up rollers 28 and 29 which are also rotatably mounted in the frame plates 14 and 16. These rollers feed the bulky sheet material to a suitable take-up mandrel (not shown).

Figure 5:
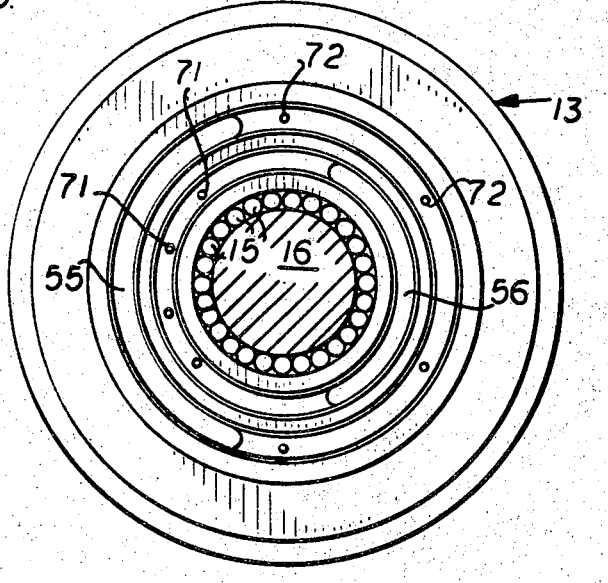
FIGURE 5 is a view taken along the line 5—5 of FIGURE 1 showing an end view of the stationary valve plate of FIGURE 2.

FIGURE 5 illustrates another embodiment of my invention. In this embodiment a roller 46 contains a plurality of grooves 48 around the perimeter thereof. These grooves are cut at an angle of 45° to the horizontal axis 50 of the roller 46. This roller 46 is attached to frames 14 and 16 in place of roller 22. A plurality of knife blades 52 are positioned around the circumference of roller 53 rotatably mounted between the vertical frames 14 and 16 a predetermined distance from roller 46. The sheet 10 is passed between the roller and the blade. The blade 52 is rotated in close enough proximity to the roller 46 so that portions of the film 10 pass over the crown of the grooves 48 and are cut by the rotating blades 52. Because of the angle of inclination of these grooves a discontinuous chopping of the individual fibrils results without cutting entirely across the sheet itself. The strength of the sheet itself is not significantly affected. This fabric possesses a tremendous advantage over a normal pile fabric because the pile fibers form an integral part of the sheet and are firmly anchored to the surface of the sheet.

In order to illustrate with greater particularity and clarity the operation of my process, the following examples are offered as illustrative of the operation thereof. The specific materials and conditions given in the examples are presented as being typical and should not be construed to limit my invention unduly.

EXAMPLE I

A 60-inch wide fibrillated web of 0.8 mil polyethylene, having a density of 0.95 gram/cc. and a melt index of 0.3 (ASTM D 1238–5DT, Condition E), is threaded through the machine described in FIGURE 2. A chopper roller 53 is provided with 12 tempered spring steel blades 52 around its circumference. The blades 52 coact with a 12-inch diameter grooved roller 46, made of mild steel and coated to a thickness of 60 mils with 80 durometer rubber. Each groove 48 in roller 46 defines an ellipse in a plane making a 45° angle with the roller axis. These grooves are ⅛-inch wide, ⅛-inch deep, and spaced so that their centers are ¼-inch apart, and having all their edges and corners chamfered and rounded on a 1/16-inch radius. Bulk film is fed to roller 12 at the rate of 20 feet per minute while the machine is being adjusted to insure clean, uniform cuts. After adjustment, the rate is increased to 150 feet per minute and about 2000 feet of the material is fed through the machine.

Air filters 2½ feet square are produced from some of this material by laminating 21 layers of this bulked film together, each layer being laid at right angles to the adjacent layers 21 and being stitched together in both directions across the film at 6-inch intervals with cotton string and subsequently edged with an aluminum channel having a ⅛-inch flange.

In another application ten 8-foot sections of this bulked fibrilated web are stitched together on 4-inch centers both lengthwise and crosswise and the edges bound to make an exceptionally warm, lightweight blanket.

Example II

The rollers 46 and 53 are replaced with a 12-inch diameter pin-studded roller 22 similar to that shown in FIGURE 4. The grooves 24 are ½-inch center-to-center with a sharp 60° included angle peak between the grooves. In each groove 36 equally spaced cylindrical pins 26 are positioned wherein each pin is 3/32-inch in diameter and has a flat, sharp edged top portion located 3/32-inch below the peaks. Web material similar to that used in Example I is threaded through the machine and the machine is started and run at an initial rate of about 15 feet per minute output while adjustments of the film tension over the pin-studded roller 22 are made. After adjustment, the rate is increased to 150 feet per minute to produce approximately cylinders 46. Thus at least four of the motor cylinders 46 will be at high fluid pressure and at least four motor cylinders 46 will be at low fluid pressure.

Referring to FIGURE 2 the output side of the charge pump 26 is connected to the tube 58 which leads to the inlet side of a check valve 59. The outlet side of the check valve 59 communicates with the arcuate passage 55. Thus if the arcuate passage 55 is under low fluid pressure, fluid leakage make-up fluid from the charge pump 26 is admitted to the transmission's working circuit through the tube 58 and check valve 59. The arcuate passage 55 also communicates with the inlet side of a relief valve 60. The outlet side of the relief valve 60 communicates with the arcuate passage 56. Thus it will be apparent that if the load applied to the transmission 10 in one direction is excessive the pressure in the arcuate passage 55 may rise sufficiently to open the relief valve 60 (e.g. 5000 p.s.i.) which serves to prevent damage due to excessive pressure but yet maintaining a closed working circuit.

The output side of the charge pump 26 is also connected to the tube 61 which leads to the inlet side of a check valve 62. The outlet side of check valve 62 communicates with the arcuate passage 56. Thus if the arcuate passage 66 is under low fluid pressure fluid leakage make-up fluid from the charge pump 26 is admitted to the transmission's working circuit through the tube 61. The arcuate passage 56 also communicates with the inlet side of a second relief valve 63. The outlet side of the relief valve 63 communicates with the arcuate passage 55. Thus it will be apparent that if the load applied to the transmission 10 is excessive in the opposite direction the pressure in the arcuate passage 56 may rise sufficiently to open the relief valve 63 (e.g. 5000 p.s.i.) which serves to prevent damage due to excessive pressure but yet maintaining a closed working circuit.

From the above it will be apparent upon overloading the transmission 10 in either direction the protective relief valves 60 and 63 relieve the working circuit from excessive pressure. Likewise, the check valves 59 and 62 permit admission of make-up oil into the low pressure side of the transmission 10 during operation in either direction.

The sationary valve plate 13 is provided with hydrostatic bearings at the interface 64. The hydrostatic bearings comprise annular grooves 65 and 66 positioned on the bearing plate 67 of the motor cylinder block 45. The bearing plate 67 is pinned to the motor cylinder block 45 by a plurality of pins one of which is shown at 68. The bearing plate 67 thus rotates with the motor cylinder block 45 and output shaft 16. The stationary valve plate 13 also includes a bearing plate 69 pinned to the valve plate 13 by a plurality of pins one of which is shown at 70 in FIGURE 1A. The hydrostatic bearing or annular groove 65 communicates with the arcuate passage 56 through ports 71 while the annular groove 66 communicates with the arcuate passage 55 through the ports 72. Thus it will be apparent that one of the hydrostatic bearings 65, 66 will be at high fluid pressure and the other at low pressure from the hydraulic working circuit of the transmission 10.

From the above it will also be apparent that the hydraulic pressure applied to the annular grooves 65 and 66 will apply a force urging separation of the bearing plate 67 from the stationary bearing plate 69 at the interface 64. Since under normal operation of the transmission 10 either groove 65 or 66 may be at high pressure the area of the groove 65 at the interface 64 should be equal to the area of the groove 66 at the interface 64. Thus operation of the transmission 10 in either direction at the same load magnitude results in the same degree of force urging separation of the motor cylinder block 45 from its associated stationary valve plate 13.

The rotatable valve plate 42 is also provided with a pair of arcuate grooves 73 and 74 as seen in FIGURE 3. From FIGURE 1A it will be seen that the arcuate groove 73 communicates with the arcuate groove 55 of the stationary valve plate 13 and the arcuate groove 74 in a similar manner communicates with the arcuate groove 56.

The rotatable valve plate 42 includes a bearing plate 75 pinned thereto by a plurality of pins one of which is shown at 76. Likewise the pump cylinder block 32 also includes a bearing plate 77 pinned thereto by a plurality of pins one of which is shown at 78. From this it will be apparent that the bearing plate 75 rotates with the rotatable valve plate 42 and the input shaft 21 through the bell-shaped member 40 while the bearing plate 77 rotates with the pump cylinder block 32 and the output shaft 16. Thus there may be relative rotation at the interface 79 between the bearing plates 75 and 77.

The bearing plate 77 is also provided at the interface 79 with hydrostatic bearings in the form of annular grooves 80 and 81. The groove 80 communicates with arcuate groove 73 through ports 82 in the bearing plate 75 and ports 83 in the rotatable valve plate 42. The groove 81 communicates with arcuate groove 74 through ports 84 in the bearing plate 75 and ports 85 in the rotatable valve plate 42.

As in the case of annular grooves 65 and 66, one of the annular grooves 80, 81 will be at high fluid pressure and the other at low pressure from the hydraulic working circuit of the transmission 10. Also it will be apparent that the hydraulic pressure applied to the annular grooves 80 and 81 will apply a force urging separation of the bearing plate 77 from its associated bearing plate 75 at the interface 79. Since under normal operation of the transmission 10 either groove 80 or 81 may be at high pressure the area of the groove 80 at the interface 79 should be equal to the area of the groove 81 at the interface 79. Thus operation of the transmission 10 in either direction at the same load magnitude results in the same degree of force urging separation of the pump cylinder block 32 from its associated rotatable valve plate 42 at the interface 79.

Referring now to FIGURE 7 it will be seen that the bearing plate 75 of the rotatable valve plate 42 is provided with a series of four arcuate shaped grooves 86 all of which communicate with the arcuate groove 73 as seen in FIGURE 1A. Also it will be seen from FIGURE 7 there is a second group of four arcuate shaped grooves 87 in the bearing plate 75 all of which communicate with the arcuate groove 74 of the rotatable valve plate 42 as evident from FIGURE 1A. Both series of arcuate grooves 86, 87 taken collectively are sometimes referred to as "kidney valves."

Referring to FIGURE 1A again it will be seen that the bearing plate 77 of the pump cylinder block 32 is provided with a series of arcuate shaped ports 88 equal to the number of pump cylinders 33. From FIGURE 6 it will be apparent that the number of pump cylinders 33 in the pump cylinder block 32 of the embodiment shown is nine. Each pump cylinder 33 includes a port 89 which communicates the cylinder 33 with its associated arcuate shaped port 88 in the bearing plate 77.

From the foregoing it will be apparent that when the pump swashplate assembly 35 is angularly displaced the pump pistons 34 will be urged to stroke operatively to displace fluid. The fluid so displaced is valved by the rotatable valve plate 42 and the stationary valve plate 13 to the motor 31 which drives the output shaft 16. In the event that the motor swashplate assembly 48 is set at zero angular displacement the motor pistons 47 cannot reciprocate and hence the motor 31 will accept no hydraulic fluid from the pump 30. In such case the pump pistons 34 cannot reciprocate due to hydraulic lock and the reaction of the pump pistons 34 against the pump swashplate assembly 35 necessitates the pump cylinder block 32 to rotate with the bell-shaped member 40 and the associated input shaft 21. Since the pump cylinder block 32 is constrained for rotation with the output shaft 16 the output shaft 16 is in mechanical direct drive relation with the input shaft

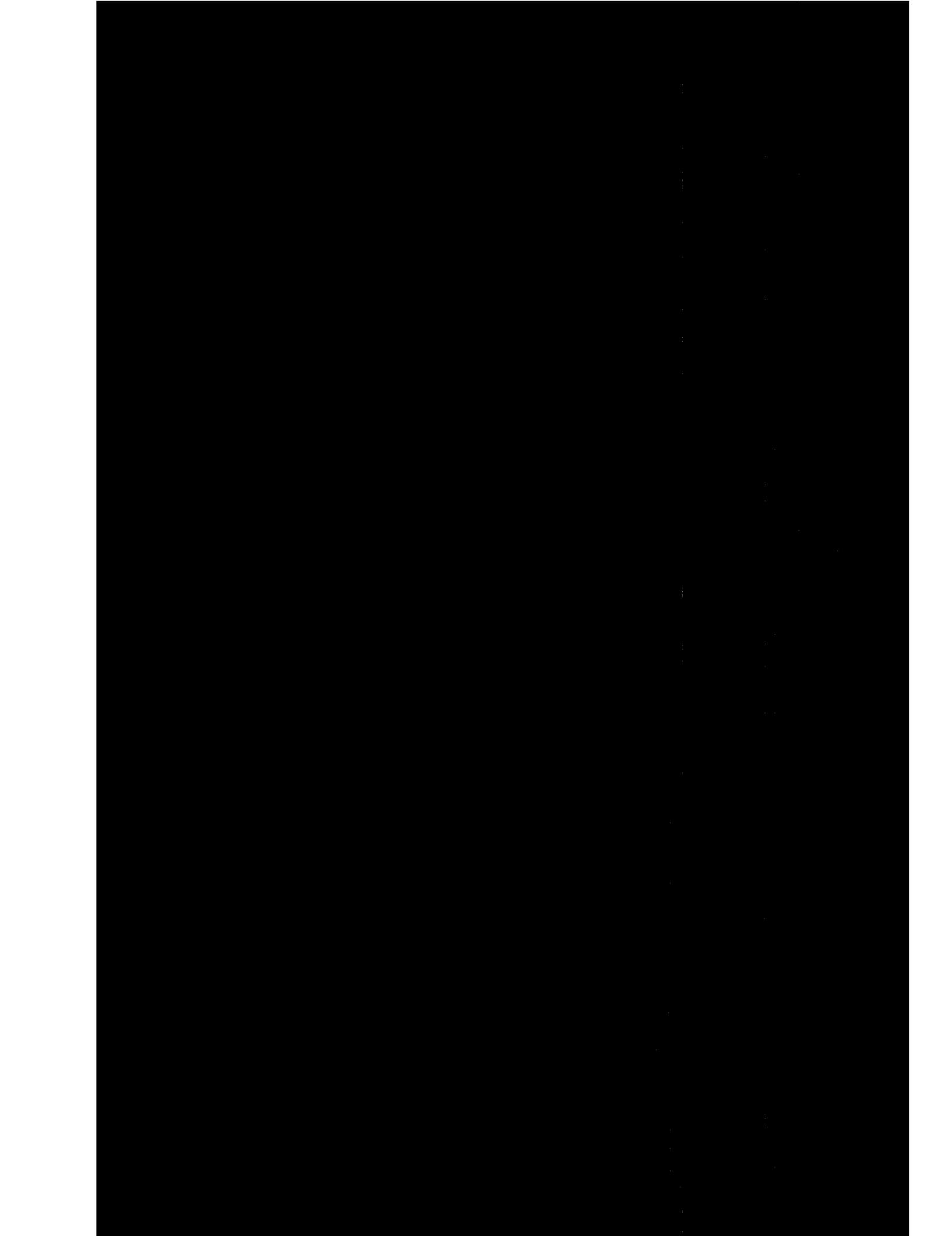

same time fluid leakage losses at the valve interfaces is minimized thereby obviously improving materially the efficiency characteristics of the transmission 10.

The hydromechanical transmission 10 was selected to illustrate the hydraulic force compensating means of the present invention to show its adaptability to a complex device. From this it is abundantly clear the hydraulic force compensating means of the present invention is obviously adaptable singularly to any axial piston type of energy translating device such as an axial piston pump or motor of the kind described above wherein hydraulic fluid is valved to and from the cylinders by valve plates or valve surfaces having a valving interface generally of the kind described herein.

Having now described a preferred embodiment of the invention it can now be seen that the objects of the invention have been fully achieved and it must be understood that changes and modifications may be made which do not depart from the spirit of the invention as disclosed nor from the scope thereof as defined in the appended claims.

I claim:

1. In a hydromechanical power transmission having a plurality of axial piston type hydraulic energy translating mechanisms operatively connected to each other, at least one of said mechanisms being a hydraulic pump and at least one of said mechanisms being a hydraulic motor, each of said mechanisms having a cylinder block member with a plurality of hydraulic cylinders in operative engagement with rotatable shafts, each said member being in abutting relation with a valve plate member forming a fluid interface therebetween for valving higher pressure fluid and lower pressure fluid to and from said cylinder operatively, an auxiliary hydraulic force compensating means for moving axially at least one of said cylinder block members into abutting relation with its adjacent valve plate member at said interface comprising at least one hydraulic ram energized by substantially continuous communication with said higher pressure fluid and positioned to move at least one of said members axially toward the other said members whereby each of said cylinder block members and said valve plate members are in fluid sealing relation at each of said interfaces.

2. In a hydromechanical power transmission having a force compensating means according to claim 1 wherein said hydraulic ram is disposed within one of said cylinder block members and operatively connected to the other said cylinder block member whereby said members are moved relative to each other into an abutting relation at each of said interfaces.

3. In a hydromechanical transmission having a force compensating means according to claim 2 wherein at least one of said rotatable shafts extends into a cylinder block member and said hydraulic ram is disposed within said cylinder block member concentrically about said shaft.

4. In a hydromechanical power transmission having a force compensating means according to claim 1 wherein at least one check valve is positioned in a rotatable element in said transmission, the inlet side of said check valve being communicatively connected to at least one of said cylinders and the outlet side being communicatively connected to said hydraulic ram whereby said higher fluid pressure energizes said hydraulic ram.

5. In a hydrochemical power transmission having a force compensating means according to claim 4 wherein said check valve is positioned in one of said cylinder block members.

6. In a hydromechanical power transmission having a force compensating means according to claim 1 wherein three check valves are positioned in one of said cylinder block members in equilaterally spaced relation, the inlet side of each of said check valves being communicatively connected to an adjacent cylinder and the outlet sides of said check valves being communicatively connected to said hydraulic ram whereby fluid at said higher pressure energizes said hydraulic ram.

7. In a hydromechanical power transmission having a force compensating means according to claim 6 wherein said hydraulic ram is disposed in said cylinder block member having said check valves and operatively connected whereby said cylinder block members and said valve plate members are moved relative to each other into abutting relation at said fluid interfaces.

8. In a hydromechanical power transmission having a force compensating means according to claim 3 wherein said hydraulic ram comprises a first annular shaped piston disposed concentrically about and operatively connected to said rotatable shaft, and a second annular shaped piston disposed concentrically about said rotatable shaft in axial spaced relation with respect to said first annular shaped piston, said second annular shaped piston being operatively connected to said cylinder block member whereby energizing of said hydraulic ram moves said cylinder block member axially with respect to said rotatable shaft in a direction to abut said cylinder block member against its associated valve plate member in fluid sealing relation at the interface thereof.

9. In a hydromechanical power transmission having a force compensating means according to claim 8 wherein a helical compression spring is interposed between said annular shaped pistons and concentric about said rotatable shaft.

10. In an axial type hydraulic energy translating mechanism having a cylinder block member with a plurality of hydraulic cylinders operatively connected to a rotatable shaft, said member being in abutting relation with a valve plate member forming a fluid interface therebetween for valving higher pressure fluid and lower pressure fluid to and from said cylinders operatively, a hydraulic force compensating means for urging at least one of said members into abutting relation with the other member at said interface comprising a hydraulic ram positioned to move at least one of said members into abutment with the other member, at least one check valve positioned in said cylinder block member, the inlet side of said check valve being communicatively connected to at least one of said cylinders and the outlet side being communicatively connected to energize said hydraulic ram whereby said ram is substantially in continuous communication with said higher pressure fluid for urging said members into fluid sealing relation at said interface.

11. In an axial piston type hydraulic energy translating mechanism having a hydraulic force compensating means according to claim 10 wherein three check valves are positioned in said cylinder block member in equilaterally spaced relation, the inlet side of each of said check valves being communicatively connected to an adjacent cylinder and the outlet sides of said check valves being communicatively connected to said hydraulic ram whereby fluid at said higher pressure energizes said hydraulic ram.

12. In an axial piston type hydraulic energy translating mechanism having a hydraulic force compensating means according to claim 11 wherein said hydraulic ram is disposed within said cylinder block member and operatively connected to said members whereby one of said members is urged into abutment with the other said member at said fluid interface.

References Cited

UNITED STATES PATENTS

| | | | |
|---|---|---|---|
| 1,163,849 | 12/1915 | Pratt | 60—53 |
| 1,362,040 | 12/1920 | Pratt | 103—162 |
| 3,036,434 | 5/1962 | Mark | 103—162 XR |
| 3,213,619 | 10/1965 | Creighton et al. | 60—53 |

EDGAR W. GEOGHEGAN, *Primary Examiner.*

U.S. Cl. X.R.

103—162